(12) United States Patent
Schneebacher et al.

(10) Patent No.: US 11,581,781 B2
(45) Date of Patent: Feb. 14, 2023

(54) LINEAR ACTUATOR, ACTUATOR SYSTEM, PIECE OF FURNITURE AND METHOD FOR CONTROLLING A LINEAR ACTUATOR

(71) Applicant: LOGICDATA Electronic & Software Entwicklungs GmbH, Deutschlandsberg (AT)

(72) Inventors: Klaus Schneebacher, Frauental (AT); Rene Semmelrath, Pischelsdorf am Kulm (AT)

(73) Assignee: LOGICDATA ELECTRONIC & SOFTWARE ENTWICKLUNGS GMBH, Deutschlandsberg (AT)

( * ) Notice: Subject to any disclaimer, the term of this patent is extended or adjusted under 35 U.S.C. 154(b) by 410 days.

(21) Appl. No.: 16/875,938

(22) Filed: May 15, 2020

(65) Prior Publication Data
US 2020/0366159 A1 Nov. 19, 2020

(30) Foreign Application Priority Data

May 17, 2019 (DE) .......................... 102019113111.1

(51) Int. Cl.
*H02K 7/06* (2006.01)
*H02K 7/116* (2006.01)
(Continued)

(52) U.S. Cl.
CPC ................ *H02K 7/06* (2013.01); *A47B 9/04* (2013.01); *A47C 1/027* (2013.01); *A47C 1/0242* (2013.01); *H02K 7/116* (2013.01); *A47C 1/03211* (2013.01)

(58) Field of Classification Search
CPC .............. A47B 9/04; A47B 9/20; A47B 21/02
See application file for complete search history.

(56) References Cited

U.S. PATENT DOCUMENTS

| 5,988,328 A | 11/1999 | Newport | |
|---|---|---|---|
| 2013/0221171 A1* | 8/2013 | Lorenzen | A47B 9/20 248/188.5 |

(Continued)

FOREIGN PATENT DOCUMENTS

| DE | 2026956 A1 | 12/1971 |
|---|---|---|
| DE | 2930263 A1 | 2/1980 |

(Continued)

*Primary Examiner* — Daniel J Rohrhoff
(74) *Attorney, Agent, or Firm* — Morgan, Lewis & Bockius LLP

(57) ABSTRACT

A linear actuator for adjusting a piece of furniture comprises a motor having a motor shaft, a conversion arrangement coupled to the motor shaft and adapted to convert a rotational movement generated by the motor shaft into an elongation of the linear actuator, and a locking arrangement coupled directly or indirectly to the motor shaft and adapted to selectively cause rotation locking of the motor shaft by means of a locking element. The locking arrangement comprises an inner part with at least one inner chamber and an outer part radially surrounding the inner part and having at least one outer chamber. The outer part and the inner part are rotatable relative to each other in such a way that the at least one inner chamber and the at least one outer chamber can be aligned with each other. The rotation locking is activated by clamping the locking element between the at least one inner chamber and the at least one outer chamber by means of rotation of the inner part and the outer part relative to each other.

20 Claims, 13 Drawing Sheets

(51) Int. Cl.
     *A47B 9/04*      (2006.01)
     *A47C 1/024*     (2006.01)
     *A47C 1/027*     (2006.01)
     *A47C 1/032*     (2006.01)

(56) References Cited

U.S. PATENT DOCUMENTS

| | | | |
|---|---|---|---|
| 2018/0172062 A1* | 6/2018 | Hu | H02K 7/06 |
| 2019/0357668 A1* | 11/2019 | Knudtson | A47B 9/04 |
| 2020/0085184 A1* | 3/2020 | Lu | A47B 9/04 |
| 2020/0136465 A1* | 4/2020 | Knudsen | H02K 7/06 |
| 2021/0215180 A1* | 7/2021 | Robier | F16B 7/14 |
| 2022/0039548 A1* | 2/2022 | Tseng | A47B 9/04 |

FOREIGN PATENT DOCUMENTS

| | | |
|---|---|---|
| DE | 2941832 A1 | 4/1980 |
| DE | 8104543 U1 | 7/1981 |
| DE | 3113043 A1 | 10/1982 |
| DE | 19542565 A1 | 5/1997 |
| DE | 102010043319 A1 | 6/2011 |
| DE | 102010012610 A1 | 9/2011 |
| DE | 102010063964 A1 | 6/2012 |
| DE | 102011001735 B4 | 10/2012 |
| DE | 102012009149 A1 | 11/2012 |
| DE | 102012020820 A1 | 4/2014 |
| DE | 102018107762 A1 | 10/2019 |
| EP | 1999534 B1 | 2/2011 |
| EP | 3164283 B1 | 1/2020 |
| GB | 2199065 A | 6/1988 |
| WO | WO-2016001147 A | 1/2016 |

\* cited by examiner

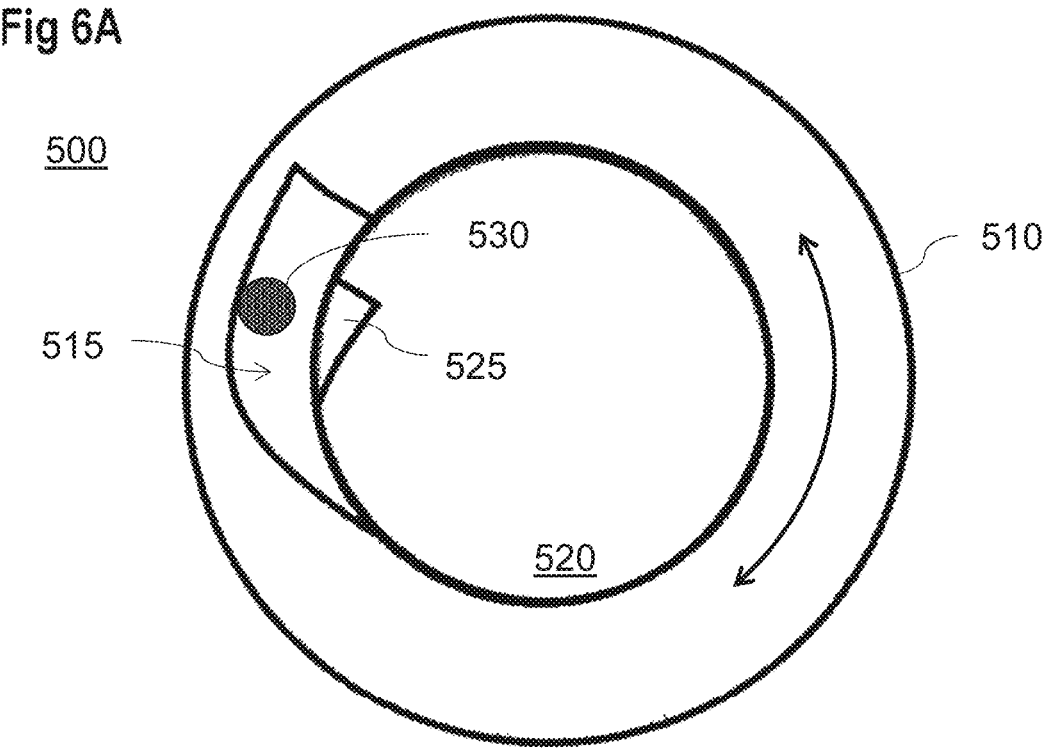
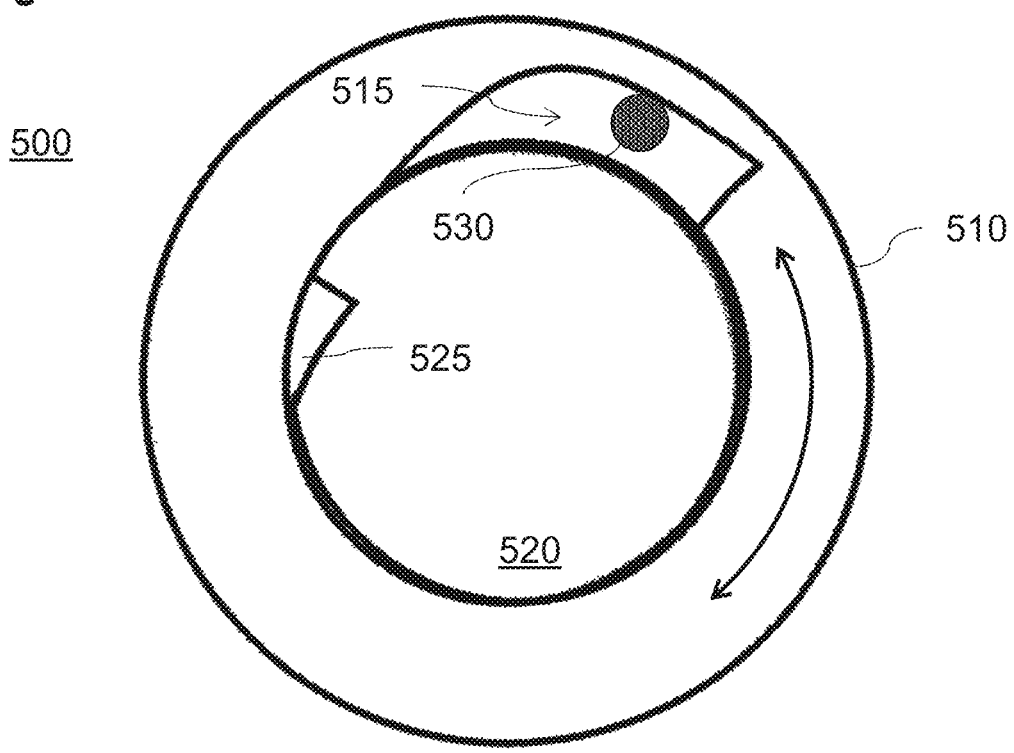

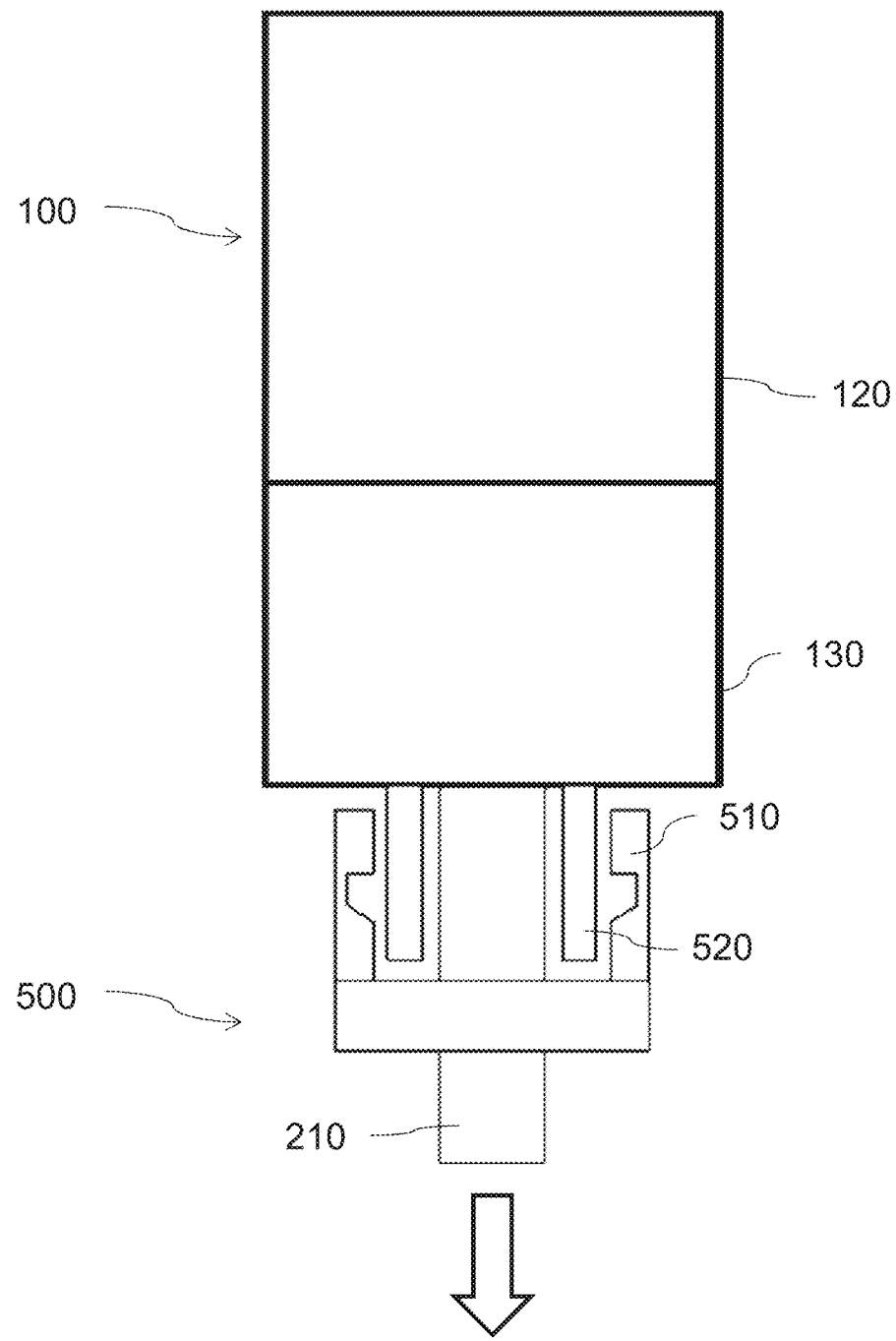

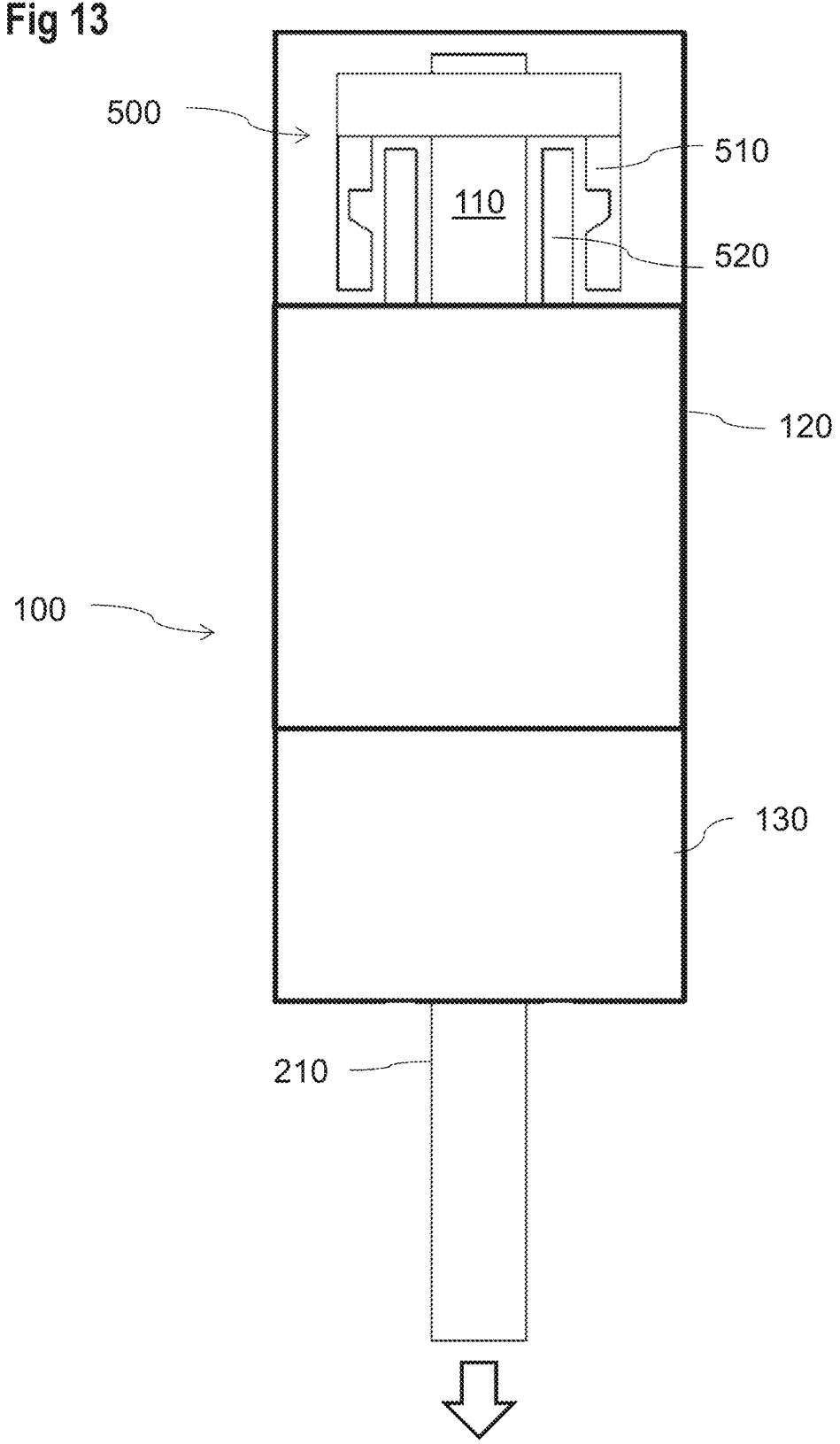

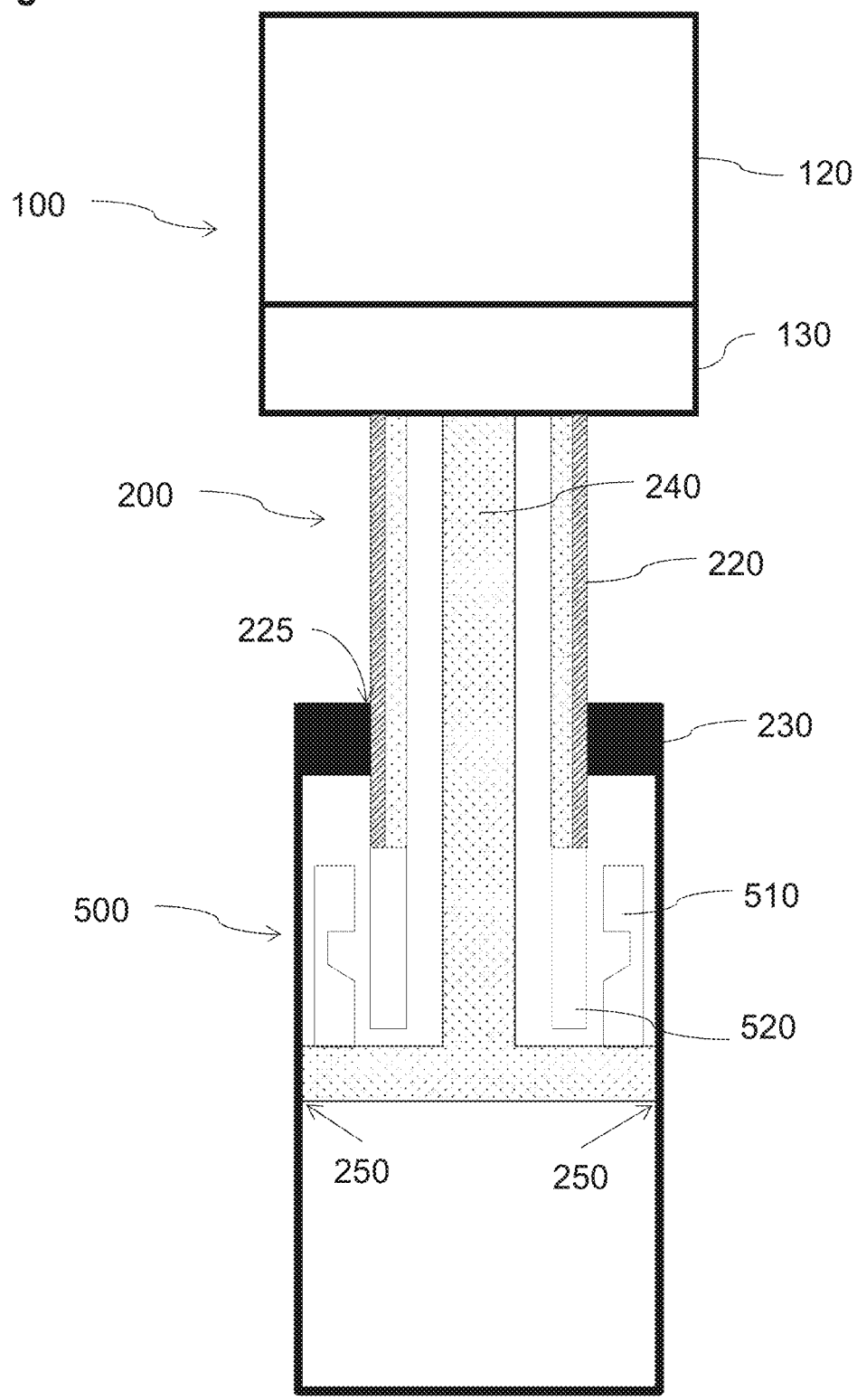

LINEAR ACTUATOR, ACTUATOR SYSTEM, PIECE OF FURNITURE AND METHOD FOR CONTROLLING A LINEAR ACTUATOR

BACKGROUND OF THE INVENTION

The present disclosure relates to a linear actuator, an actuator system with such a linear actuator, a piece of furniture with such a linear actuator or such an actuator system, and a method for controlling such a linear actuator.

Adjustable furniture is known both in the field of office furniture and in the home sector. The most common designs in the office furniture sector are, for example, electrically adjustable tables or chairs, while electrically adjustable beds, seating furniture or reclining furniture are known in the home sector.

The adjustment is usually carried out by linear actuators, which are built into one or more columns of the table or into a frame of the bed, seating furniture or reclining furniture.

Such linear actuators are regularly composed of an electric motor which drives a motor shaft and a conversion arrangement which converts a rotation of the motor shaft into a linear elongation of the linear actuator. For example, spindle-nut systems are used as such conversion arrangements, where a spindle is driven by the motor shaft via a gear and causes a linear displacement of the nut. In the example of a table, this then leads to raising or lowering of the table top.

However, to ensure that a force acting in a linear direction on the linear actuator, for example via a table top, does not cause the spindle or motor shaft to rotate in the opposite direction, the components acting together are usually designed accordingly. For example, friction between the components is deliberately chosen to be so high that self-locking occurs. However, the degree of self-locking also determines the efficiency of the linear actuator. Accordingly, more energy must be expended for linear adjustment of the linear actuator with high self-locking than with low or non-existent self-locking. With conventional linear actuators, it is therefore necessary to weigh up between an acceptable degree of efficiency and the necessary self-locking.

SUMMARY OF THE INVENTION

The present disclosure specifies an improved actuation concept that allows for an improved efficiency of a linear actuator.

The improved actuation concept is based on the insight that with a linear actuator, feedback effects from the driven side to the driving side can basically occur in both drive directions, which can lead to undesired behavior of the entire system. Such undesired feedback effects can be caused by gravitational forces, for example the weight of a table top or the weight of a table frame, or in the case of a bed the weight of a mattress.

Accordingly, the improved actuation concept proposes to selectively block a movement of the driving side, e.g. a motor shaft, and thus selectively cause a rotation locking of the motor shaft. The rotation locking can either be provided for both possible directions of rotation of the motor shaft or alternatively only in one selected direction of rotation, while rotation is possible in a second direction of rotation without hindrance. For this purpose, the linear actuator for adjusting a piece of furniture is equipped with a locking arrangement which is coupled with a motor shaft of a motor of the linear actuator. To this end, the locking arrangement comprises at least one locking element, an inner part with at least one inner chamber and an outer part radially surrounding the inner part with at least one outer chamber, wherein the inner chamber and the outer chamber can be aligned by rotation relative to one another. The two chambers are designed in such a way that the locking element can be clamped between the inner and the outer chamber in order to activate the rotation locking.

In order to release the rotation locking and thereby enable continuous movement of the motor shaft, the clamping of the locking element can be released by a rotational movement and the locking element can be moved into a receiving chamber which can completely receive the locking element by applying a force. Only one of the two chambers of the outer chamber and the inner chamber is sufficiently large for this purpose, while the other chamber is specifically not suitable for complete reception and therefore makes it possible to clamp the locking element. The number of receiving chambers is at least as large as the number of locking elements, e.g. identical so that each locking element can be received in one of the receiving chambers for the continuous movement of the motor shaft. A number of non-receiving chambers is at least one. The smaller number of the number of locking elements and the number of non-receiving chambers determines the possible number of locking elements that can be clamped simultaneously.

The movement of the locking element into the receiving chamber can also be assisted by the shape of the non-receiving chamber and a corresponding rotational movement between the inner and outer chambers. The linear actuator or locking arrangement is designed so that a repositioning force acts radially on the locking element to move the locking element from the receiving chamber towards the other chamber. When the rotation locking is deactivated, the deflection force on the locking element is therefore generated, which acts in the direction of the receiving chamber and is greater than the repositioning force. The deflection force can be generated, for example, as a centrifugal force or as an electromagnetic force. The restoring force is generated, for example, by a spring force or a gravitational force.

The selective rotation locking makes it possible to design the linear actuator with a high degree of efficiency, for example by low friction. This can also lead to a reduction of noise of the linear actuator, for example by lower gear noise.

An implementation example of a linear actuator for adjusting a piece of furniture according to the improved actuating concept comprises a motor with a motor shaft, a conversion arrangement coupled to the motor shaft and arranged to convert a rotary motion generated by the motor shaft into a change in length or elongation of the linear actuator, and a locking arrangement. The change in length or elongation represents the actual actuator effect of the linear actuator, i.e. an adjustment in a longitudinal direction.

The locking arrangement is coupled directly or indirectly to the motor shaft and is designed to selectively effect a rotational locking of the motor shaft by means of a locking element. The locking arrangement comprises an inner part with at least one inner chamber and an outer part radially surrounding the inner part with at least one outer chamber, wherein the outer part and the inner part are rotatable relative to one another in such a way that the at least one inner chamber and the at least one outer chamber can be aligned with one another. At least one of the chambers is arranged as a receiving chamber for completely receiving the locking element, wherein the one or more chambers in the respective other part are arranged for incomplete reception of the locking element, depending on whether the receiving chamber is arranged in the inner part or outer part. In other words, either the at least one inner chamber is arranged as a receiving chamber for completely receiving the locking element and the at least one outer chamber is arranged for not completely receiving the locking element, or the at least one outer chamber is arranged as a receiving chamber for completely receiving the locking element and the at least one inner chamber is arranged for not completely receiving the locking element.

In such a linear actuator, the rotation locking is activated by clamping the locking element between the at least one inner chamber and the at least one outer chamber by means of rotation of the inner part and the outer part relative to each other. The rotation locking is deactivated or can be deactivated by rotating the inner part and the outer part relative to each other in such a way that the clamping of the locking element is released, and by moving the locking element radially into the receiving chamber. This can be achieved, for example, by appropriate shaping of the at least one inner chamber and the at least one outer chamber. Rotation of the motor shaft with the rotation locking being deactivated is enabled by generating a deflection force acting on the locking element radially in the direction of the receiving chamber, which is greater than a repositioning force acting on the locking element radially in the opposite direction.

Such a linear actuator thus enables the selective activation and deactivation of the rotation locking and a mechanism to enable rotation of the motor shaft for a certain period of time or state in which the rotation locking is deactivated.

For example, the linear actuator is designed in such a way that when the rotation locking is deactivated, the rotation of the inner part and the outer part relative to each other is effectable by a controlled rotational movement of the motor shaft. For example, the clamping of the locking element corresponds to a rotation or application of force in a first direction of rotation, while the deactivation or release of the clamping is effected by application of force or rotation in the opposite, second direction of rotation. For example, when the rotation locking device is being deactivated, the rotation of the inner part and the outer part in relation to each other amounts to less than 360°, or in the case of several chambers, less than the corresponding fraction of 360°.

For example, the rotational movement mentioned above first loosens the clamping of the locking element and then further rotation moves the locking element into the receiving chamber. For this purpose, the non-receiving chamber is, for example, shaped in such a way that in this direction of rotation the locking element is pushed into the receiving chamber without clamping. As long as the at least one inner chamber and the at least one outer chamber are not aligned with each other, the locking element remains in the receiving chamber. Only when the chambers are aligned to each other again, the activation of the rotation locking is generally enabled again. This activation can occur, for example, when the chambers are aligned with each other again and no deflection force greater than the repositioning force acts on the locking element, so that the locking element is moved out of the receiving chamber again.

The repositioning force is formed by a spring force or a gravitational force, for example. For example, a spring device is provided in the receiving chamber, which presses the locking element radially out of the receiving chamber in the direction of the not completely receiving inner chamber or outer chamber, depending on the design.

In an example implementation of a linear actuator, the receiving chamber has a radially inclined boundary on at least one side in the axial direction, through which the repositioning force on the locking element is effectable by a gravitational force. For example, the boundary in the receiving chamber is inclined in such a way that the locking element experiences a natural gravitational force, which moves the locking element radially in the direction of the chamber that is not completely receiving. Accordingly, the locking element is moved without any additional force, in particular the aforementioned deflection force, in the direction of a locking position at which the rotation locking is activated.

As already mentioned, the rotation of the motor shaft with the rotation locking being deactivated is enabled by generating the deflection force acting on the locking element. For example, the linear actuator is designed so that the deflection force holds the locking element in the receiving chamber.

The locking element is designed as a rolling body, for example as a ball or spherical ellipsoid or cylindrical.

By using the locking arrangement, it is possible to prevent or at least stop rotary movements in the linear actuator that are particularly not triggered by the motor itself. Therefore, it is no longer absolutely necessary, as is the case with conventional linear actuators, to equip gears or conversion arrangements with sufficiently high friction to prevent such externally induced movements. Accordingly, for example, with different implementations of the linear actuator according to the improved actuation concept, the conversion arrangement alone or in combination with the motor is not self-locking. Self-locking means in particular that the linear actuator can be driven via the motor shaft, but not via the application of a force along the elongation of the linear actuator.

As already mentioned, the locking arrangement is coupled directly or indirectly to the motor shaft, wherein there are various possibilities for these couplings. For example, one part of a group consisting of the outer part and the inner part forms a rotor of the locking arrangement coupled to the motor shaft and another part of this group forms a stator of the locking arrangement. The locking arrangement can therefore be coupled to the motor shaft in a variety of implementations.

In one implementation, the coupling is formed by a rotationally fixed connection of the rotor of the locking arrangement to the motor shaft, the stator of the locking arrangement being fixed to a housing of the motor or of a gearbox. For example, the gearbox is connected between the motor shaft and the conversion arrangement and is designed for instance as a speed reduction gearbox. The locking arrangement can be located either inside the motor housing, for example integrated in the motor, or outside the motor housing.

The motor housing can, for example, be cylindrical. Typically, the motor housing is closed on one side and only allows passing through and supporting the motor shaft. An end cap can be provided on the opposite side. This closes the housing after the stator, rotor and other motor components have been inserted into the motor housing during production. The locking arrangement may be installed inside the motor housing, particularly near one or both front ends. Alternatively, the locking arrangement can be an integral part of the end cap.

In another configuration, the locking arrangement is coupled to the motor shaft via a rotationally fixed connection of the rotor of the locking arrangement to a spindle of the conversion arrangement, with the stator fixed to a housing of the motor or of a gearbox.

In another configuration, the coupling is formed by a rotationally fixed connection of the rotor of the locking arrangement to an outer rotor of the motor, the stator of the locking arrangement being fixed to an inner stator of the motor. In this case, for example, the locking arrangement also features an external rotor.

In a further configuration of the coupling between the locking arrangement and the motor shaft, this is formed by a rotationally fixed connection of the rotor of the locking arrangement to a rotating component of the conversion arrangement, the stator of the locking arrangement being attached to a non-rotating component of the conversion arrangement.

The described principle of the locking arrangement can thus be used in a variety of ways with different motor types and motor implementations as well as different implementations of linear actuators. Depending on where the locking arrangement is mounted, the motor shaft due to a constructional freedom of movement may be easily moved back and forth even in the locked state. For example, if the locking arrangement is attached to the spindle, the motor shaft may also move slightly back and forth in the locked state depending on the play present.

In various implementations, the selective rotation locking can be provided for both directions of rotation of the motor shaft. For various implementations, however, it may be sufficient or even desired that a freewheeling direction exists. For example, in different implementations of a linear actuator, the locking arrangement is therefore set up to permanently enable rotation of the motor shaft in a first direction of rotation and to selectively effect the rotation locking in an opposite second direction of rotation. In particular, the rotation locking can only be effected in this second direction of rotation.

There are various options for generating the deflection force. In particular, the deflection force can be generated as a centrifugal force, an electromagnetic force or a fluid-mechanical force. The options are explained in more detail below.

For example, the outer part of the locking arrangement is designed to rotate around the inner part and the at least one outer chamber is designed as the receiving chamber. The locking arrangement is configured to generate the deflection force via a centrifugal force by rotating the outer part around the inner part, whereby a rotation speed of the outer part is greater than a threshold value. In particular, the threshold value is selected such that the centrifugal force exerted on the locking element by the rotation of the outer part with the receiving chamber is greater than the repositioning force which pulls the locking element inwards. This also means that when the locking arrangement is rotated at a speed of rotation lower than the threshold value, the repositioning force is greater than the centrifugal force generated and thus the locking element is moved, for instance pulled or pushed, from the outer receiving chamber into the inner chamber. This can eventually lead to the locking element being clamped between the outer chamber and the inner chamber, thus activating the rotation locking.

In another implementation, the locking element is magnetoactive and the locking arrangement includes an electromagnet. In this case, the locking arrangement is configured to generate the deflection force by means of the electromagnet as an electromagnetic force acting on the locking element. The term magnetoactive means that magnetic fields cause a force to act on the locking element. This is known to be achieved by selecting a material, such as a ferrous or ferromagnetic material.

For example, the electromagnet is formed by a coil and a metal bracket as a core of the coil, which exerts a force on the locking element that magnetically attracts the locking element. For this purpose, for example, the ends of the metal bracket are arranged in the area of the receiving chamber. For example, the electromagnet is located in the stationary part of the locking arrangement rather than in the rotating part. However, it is possible to use designs with the receiving chamber as an outer chamber as well as an inner chamber. For example, the outer part is designed to rotate around the inner part and the at least one inner chamber is designed as the receiving chamber. Alternatively, the inner part is designed rotatable within the outer part and the at least one outer chamber is designed as the receiving chamber.

In various implementations, the linear actuator further comprises a measuring device for determining a relative position of the inner part and the outer part to each other. This also makes it possible to determine the position of the at least one inner chamber relative to the at least one outer chamber. This information can be helpful in controlling the locking arrangement with regard to activation/deactivation via controlled rotary movements of the motor.

For example, a linear actuator according to one of the previously described implementations can be combined with a motor control to form an actuator system. The motor control is configured, for example, to enable activation of the rotation locking device by controlling the motor to a rotational movement of the motor shaft in such a way that the at least one inner chamber and the at least one outer chamber are aligned with each other in such a way that the locking element is moved out of the receiving chamber by the repositioning force. Furthermore, the motor control is arranged to deactivate the rotation locking by controlling the motor to a rotational movement of the motor shaft.

In an implementation of the actuator system, the rotation of the inner part and the outer part relative to one another for clamping the locking element between the at least one inner chamber and the at least one outer chamber is effectable by controlling the motor to a rotational movement of the motor shaft and/or by applying force to the conversion arrangement along a direction of elongation. This is particularly advantageous when the rotation locking has previously been enabled to be activated by aligning the at least one inner chamber and the at least one outer chamber with one another. The actual clamping of the locking element can thus be achieved either actively by controlling the motor or passively by external force, or by a combination of the two effects.

In a further implementation of the actuator system, the motor control is further configured to cause the generation of the deflection force which enables rotation of the motor shaft when the rotation lock is deactivated.

In various implementations, the motor control is attached to the linear actuator or forms an integrated unit with the linear actuator. Alternatively, the motor control can also be arranged separately from the linear actuator.

In accordance with the improved actuation concept, a piece of furniture with at least one adjustable component and with a linear actuator according to one of the implementations as described or with an actuator system according to one of the implementations for adjusting the component as described is also proposed. Such pieces of furniture are for example tables, beds or adjustable seating and reclining furniture.

The improved actuation concept also concerns a method for controlling a linear actuator according to one of the described implementations. The method comprises for example at least one of the following steps:

Enabling activation of the rotation locking device by controlling the motor to a rotational movement of the motor shaft such that the at least one inner chamber and the at least one outer chamber are aligned with each other so that the locking element is moved out of the receiving chamber by the repositioning force;

Deactivating the rotation locking by controlling the motor to rotate the motor shaft; and Effecting the generation of the deflection force when the rotation lock is deactivated for rotation of the motor shaft. Depending on the implementation of the linear actuator, the generation of the deflection force is effected, for example, by generating the centrifugal force on the locking element or by activating the electromagnet.

Further implementations of the method result directly from the various implementations which are described in connection with the description of the linear actuator and in particular the locking arrangement.

BRIEF DESCRIPTION OF THE DRAWINGS

In the following, the improved actuation concept is explained in detail on the basis of exemplary embodiments with reference to the drawings. Components which are functionally identical or have an identical effect may be provided with identical reference signs. Identical components or components having an identical function may be explained only with reference to the figure in which they first appear. The explanation is not necessarily repeated in subsequent figures.

In the drawings:

FIGS. 5A, 5B, 6A, 6B, 7A and 7B show various example states of a locking arrangement;

FIGS. 12 to 15 show various implementations of linear actuators with a locking arrangement.

DETAILED DESCRIPTION

Figure 1:
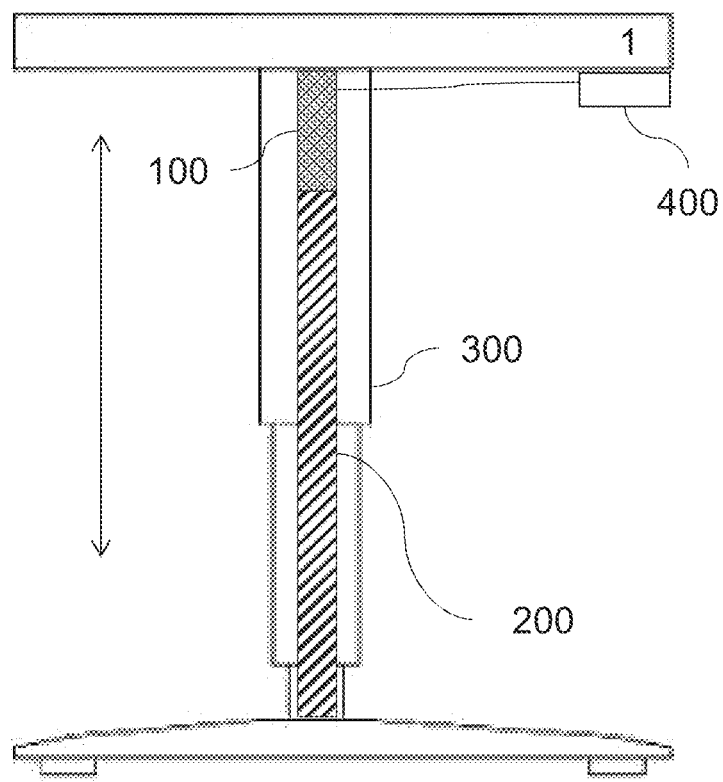
FIG. 1 shows an implementation example of an electrically adjustable piece of furniture.

FIG. 1 shows a schematic structure of an electrically adjustable piece of furniture, which in this case is designed as a height-adjustable table. The table has a table top 1, which can be adjusted in height by means of a linear actuator formed by a motor arrangement 100 and a conversion arrangement, e.g. a spindle-nut system 200. The conversion arrangement is adapted to convert a rotary movement generated by the motor arrangement 100 into a linear deflection or length change or elongation of the linear actuator. The linear actuator is arranged in a telescopic column 300. The motor arrangement 100 is connected to a control unit 400, via which a user can, for example, enter driving commands for the table to effect a height adjustment.

Figure 2:
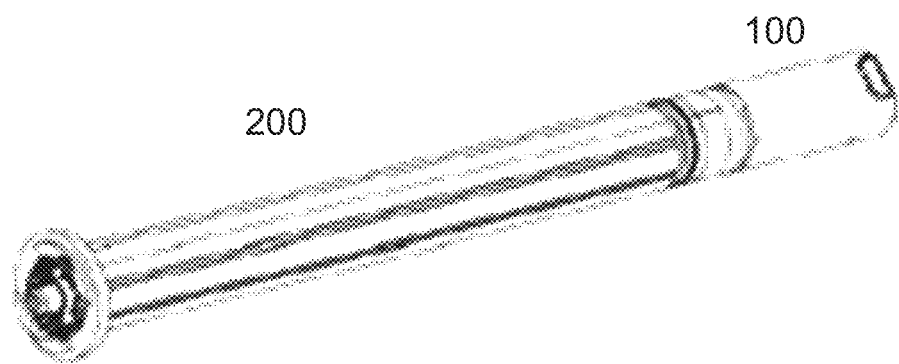
FIG. 2 shows a schematic representation of a linear actuator.

FIG. 2 shows a perspective view of a linear actuator composed of a motor arrangement 100 and a spindle-nut system 200 as an example of a conversion arrangement. The motor arrangement 100 has a rotating axis, such as a motor shaft, which is mechanically coupled to the spindle-nut system 200, which converts the rotating motion into elongation or linear displacement of the linear actuator. Instead of the spindle-nut system 200, another type of conversion arrangement can also be used, which is coupled to the motor shaft and is arranged to convert a rotary motion generated by the motor shaft into an elongation of the linear actuator, for example based on cable pulls. The elongation of the linear actuator, i.e. its actuator action, is carried out, for example, in the longitudinal direction of the motor shaft.

A motor control can be integrated in various configurations in the control unit 400 or separately from the control unit in its own housing or on or in the linear actuator 100.

As mentioned above, spindle-nut systems are used, for example, to convert rotary movements into linear movements in a linear actuator. However, when a load is applied axially to the nut of the spindle-nut system, and the load is large enough to overcome the friction, the opposite happens and the linear motion is converted into rotary motion. This is usually an undesirable effect. Although such an effect can occur regardless of the orientation of the spindle, reverse drive most often occurs in vertical applications when a load is stopped and an external retaining mechanism such as a brake or counterweight fails.

In conventional linear actuators, for example, such an effect occurs in table furniture with vertically adjustable table tops, where the load on the table top is transferred to the actuator via mechanics. Under certain circumstances, such an effect can also occur when the table is transported, if the table is lifted using the table top. The forces that can trigger the backward drive or a downward slide are determined, for example, by the moving parts of the table frame, such as the weight and/or mass inertia of these parts.

It has been found that the efficiency of a linear actuator is the main indicator of whether or not a spindle takes over the backward drive or starts to slide or not. The higher the efficiency, the more likely the spindle or linear actuator is to slip when an axial force is applied, i.e. a force along the direction of length change.

The efficiency of the linear actuator with a spindle-nut system is determined mainly by the lead angle of the spindle and the friction in the spindle-nut system. The larger the lead angle, the higher the efficiency of the spindle. This means that spindles with a higher lead angle, for example 20 mm per revolution instead of 5 mm per revolution, have a higher efficiency and therefore tend to slip more easily. In addition to the lead angle, lubrication or a geometry of the gearing, for example, also influence the efficiency, as these affect friction.

In various implementations, a motor of the linear actuator can drive the conversion arrangement directly or by means of an interposed speed reducing gearbox. Such a speed reducing gearbox can also be integrated into the motor, in which case one can speak of a geared motor. Such a linear actuator is self-locking if the entire chain consisting of motor, optional gear unit and conversion arrangement is self-locking, i.e. if, for example, only the spindle of a spindle-nut system is self-locking, for example due to friction or the pitch angle of the lubrication etc., or if the spindle is self-locking in combination with the speed reduction gear and/or the motor. In the case of the motor, for example, friction due to carbon brushes, bearings or magnetic detent torques can influence the self-locking effect.

High self-locking reduces the overall efficiency of the linear actuator, which requires a larger and more expensive motor.

In accordance with the improved actuation concept, it is proposed to equip the linear actuator with a locking arrangement which is directly or indirectly coupled to the motor shaft of the motor and is designed to selectively cause a rotational locking of the motor shaft by means of at least one locking element. Due to the possibility of effecting a selective rotational locking of the motor shaft, i.e. locking the linear actuator, no self-locking drive arrangement is required to avoid slipping. As a result, less power is required from the motor, which reduces the required installation space or the volume and/or weight of the linear actuator at lower costs and, in particular, when a speed reducing gear is not required. If a speed reducing gear is omitted, a source of unwanted noise from the linear actuator is also eliminated. In the following, various implementations of such locking arrangements are described in detail.

Figure 3:
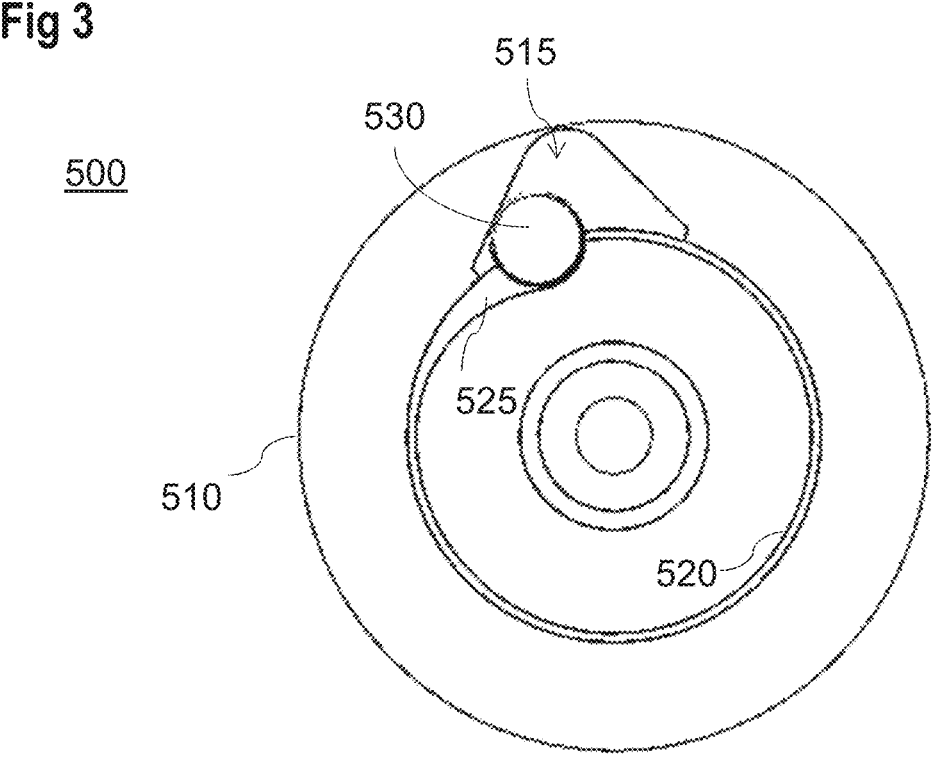
FIG. 3 shows an implementation example of a locking arrangement for unidirectional locking.
Figure 4:
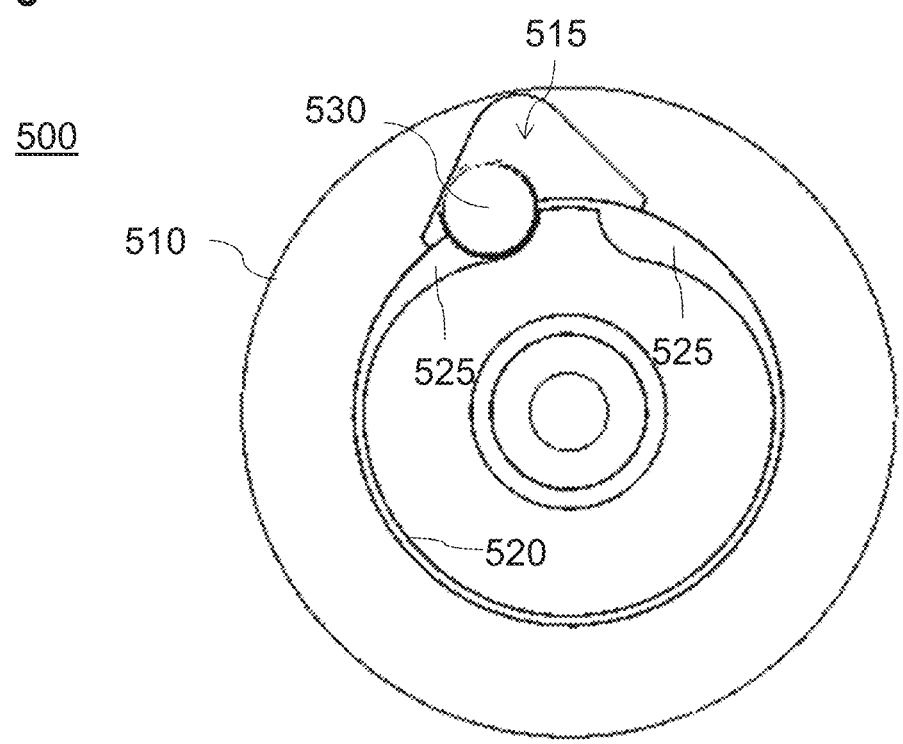
FIG. 4 shows an implementation example of a locking arrangement for bidirectional locking.

FIG. 3 and FIG. 4 show examples of implementations of a locking arrangement 500 in an axial plan view. The locking arrangement 500 comprises an outer part 510 with an outer chamber 515 and an inner part 520 with at least one inner chamber 525. The outer part 510 surrounds the inner part 520 radially and is rotatable around the inner part 520, especially in the implementations shown in FIGS. 3 and 4.

The locking arrangement 500 also comprises a locking element 530, which is designed as a rolling body, for example as a sphere or an almost spherical ellipsoid or cylindrical. An essential property of the locking element 530 is that it can easily roll between inner chamber 525 and outer chamber 515, provided that outer part 510 and inner part 520 are aligned with each other. The outer chamber 515 is designed in such a way that it is equipped to completely receive the locking element 530. In contrast, the inner chamber 525 is shaped in such a way that it cannot completely receive the locking element 530.

In both FIG. 3 and FIG. 4, the locking element 530 is shown in a locking position in which the locking element 530 is clamped between the at least one inner chamber 525 and the at least one outer chamber 515. This state can be achieved, for example, by correspondingly rotating the inner part and the outer part relative to each other, i.e. in this case by rotating the outer part.

The implementations of FIGS. 3 and 4 differ from each other in that the locking arrangement 500 of FIG. 3 is set up for a unidirectional locking, whereas in FIG. 4 a bidirectional locking is possible or intended. In both cases, the illustrated clamping of the locking element 530 can be released by slightly turning the outer part 510 counterclockwise. On the other hand, in the illustrated locking position, the locking element 530 effectively prevents clockwise rotation of the outer part 510. Since the rotating part of the locking arrangement 500, in this case the outer part 510, is directly or indirectly coupled with the motor shaft of the motor, a rotation locking for the motor shaft is thus also effected.

In the opposite direction of rotation of the outer part 510, on the other hand, a rotational movement of the outer part 510 is possible for both configurations at least to a limited extent. This is because the inner chamber 525 is shaped in such a way that the locking element 530 with continuous movement is pushed into the outer chamber 515, so to speak. In the implementation example in FIG. 3, this is continuously possible, i.e. rotation of the motor shaft in the direction of rotation is permanently enabled. In the design example in FIG. 4, on the other hand, after an almost complete rotation of the outer part 510, the locking element 530 can again become clamped between the other inner chamber 525 and the outer chamber 515.

The operating principle of the locking arrangement 500, i.e. how a rotation locking is activated and deactivated and how rotation of the motor shaft is specifically enabled, is described below in connection with FIGS. 5A, 5B, 6A, 6B, 7A and 7B. For example, a locking arrangement 500 with unidirectional rotation locking is shown. However, the following description also allows the skilled person to understand the application for a bi-directional locking arrangement.

Figure 5A:
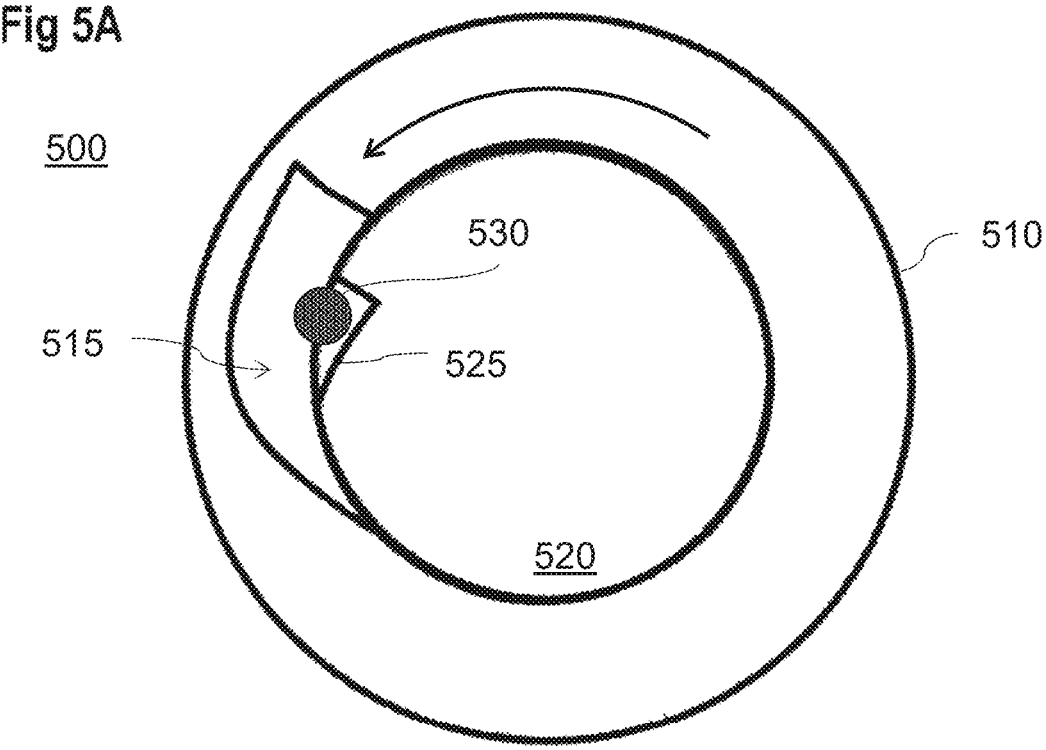

With reference to FIG. 5A, locking arrangement 500 is shown in a state where outer chamber 515 and inner chamber 525 are aligned and locking element 530 is released or not clamped. In general, the locking element 530 can therefore move almost freely between the inner chamber 525 and the outer chamber 515.

Figure 5B:
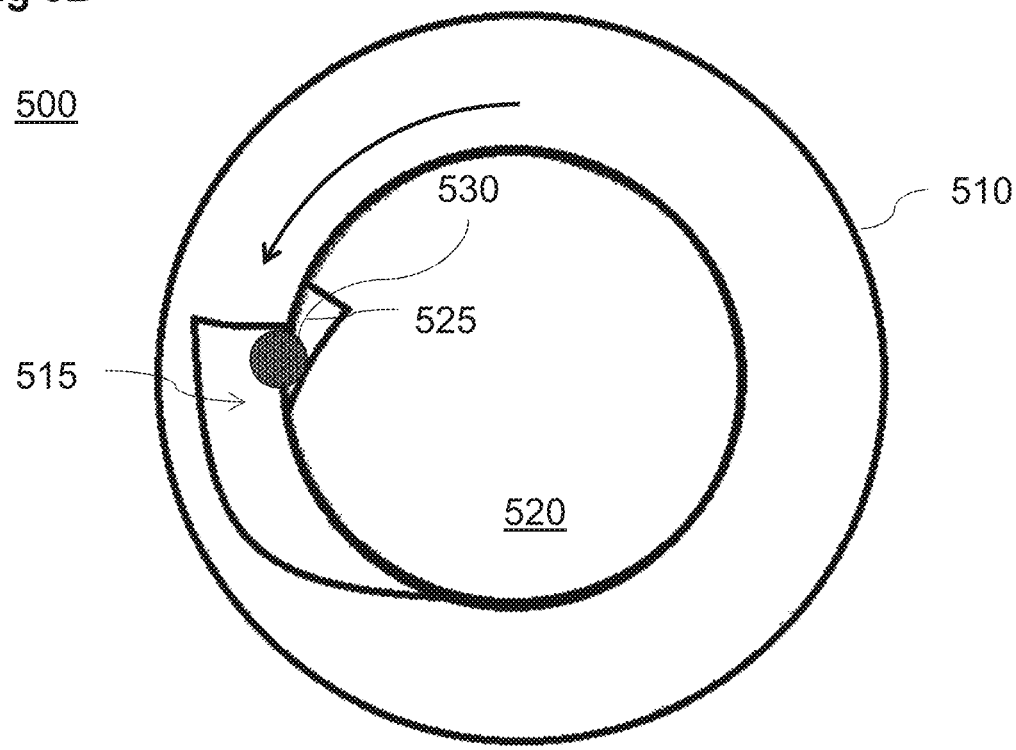

With reference to FIG. 5B, after a slight counterclockwise rotation of the outer part 510, an edge of the outer chamber 515 is positioned against the locking element 530 in such a way that this edge, supported by the shape of the inner chamber 525, namely a flat transition to the maximum radius of the cylindrical inner part 520, moves the locking element 530 into the outer chamber 515. Thus, with the solution of the clamping of the locking element 530 described in connection with FIGS. 3 and 4 and the rotation of the outer part 510 and the inner part 520 relative to each other, whereby the locking element 530 is moved radially into the receiving chamber, the rotation locking is deactivated.

In order to enable clockwise rotation of the motor shaft 110 while the rotation locking device is deactivated without clamping, it is provided for the locking arrangement 500 that the locking element 530 is held in the outer chamber by forces acting radially outwards on it.

With reference to FIGS. 6A and 6B, this can be achieved, for example, by generating a centrifugal force on the locking element 530 by means of a rotational movement of the outer part 510. This centrifugal force forms a deflection force acting radially in the direction of the outer chamber 515, which serves as the receiving chamber. The centrifugal force or deflection force is dimensioned in such a way that it is greater than a repositioning force acting in the opposite radial direction on the locking element. Such a repositioning force can, for example, be effected by a gravitational force on the locking element 530 or by a spring force, for example triggered by a spring device in the receiving chamber, which presses the locking element in the direction of the at least one internal chamber.

With reference to FIGS. 6A and 6B, states are shown in which the centrifugal force presses the locking element 530 against a radially outward boundary of the receiving chamber. In particular, it is apparent from the illustration in FIG. 6A that even if the inner chamber 525 and the outer chamber 515 are directly aligned with each other, clamping of the locking element 530 and thus activation of the rotation locking device is effectively prevented.

Just for the sake of completeness, it should be mentioned that the necessary centrifugal force, which is greater than the repositioning force, is necessarily associated with a minimum rotational speed of the locking arrangement 500 or the rotating outer part 510. Thus the speed of rotation determines whether the locking element 530 moves radially outwards or radially inwards. Translational movements, i.e. along a circumference of a circle, are not taken into account.

Figure 7A:
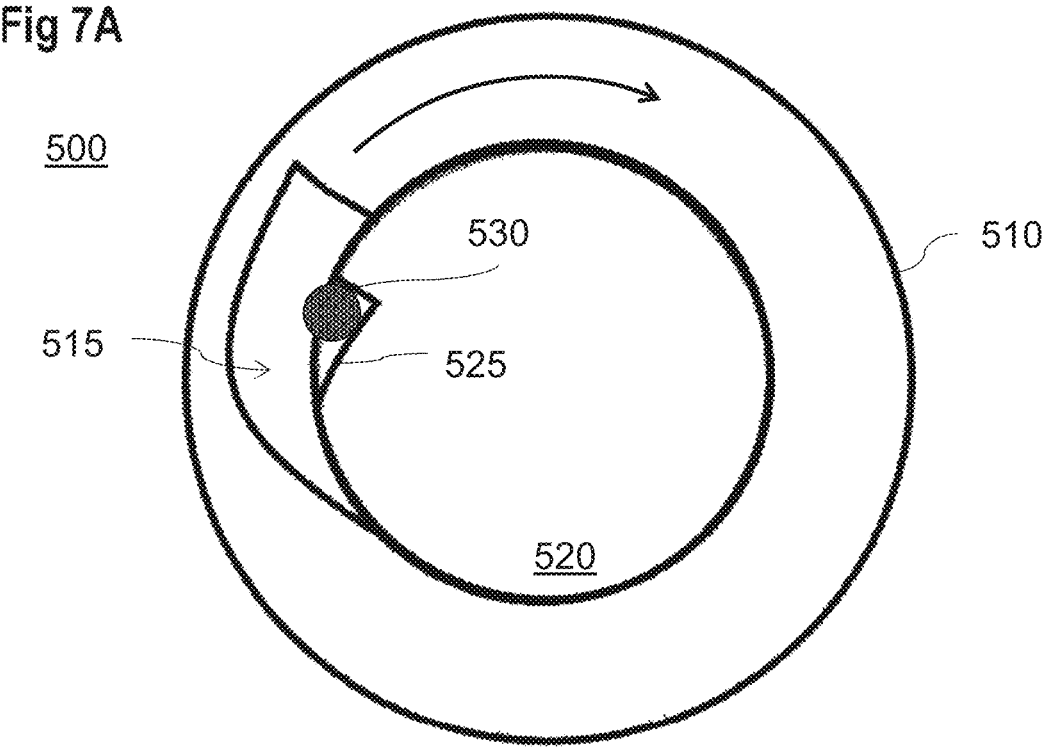
Figure 7B:
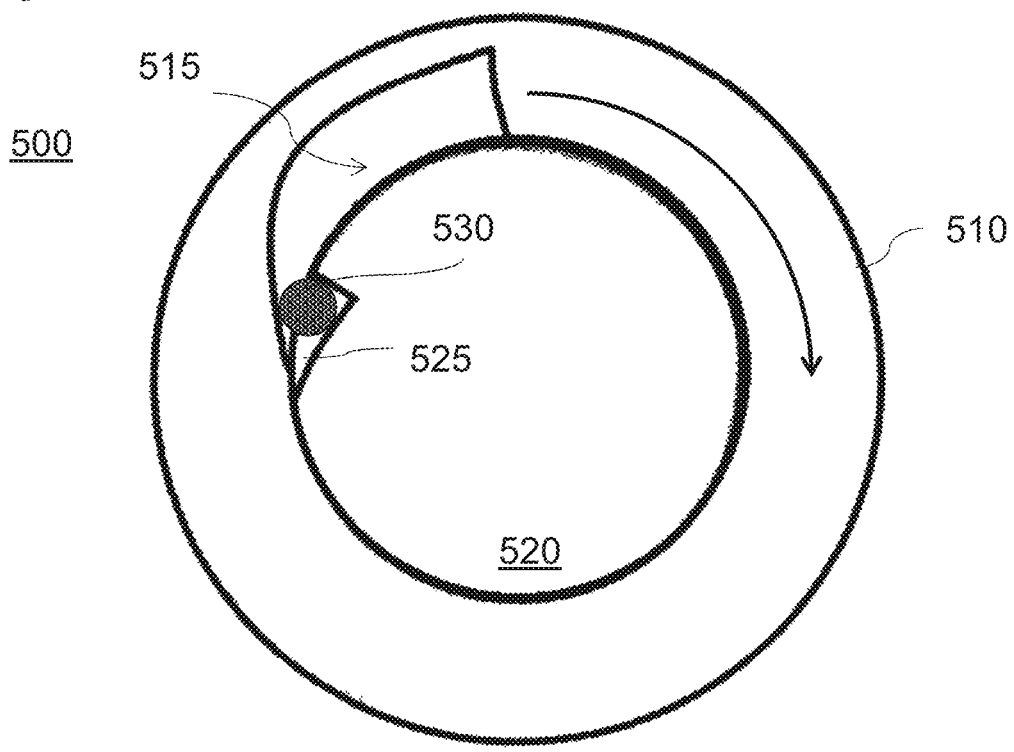

FIGS. 7A and 7B show states of the locking arrangement 500 in which the outer part 510 rotates at a rotational speed lower than the minimum speed. Therefore, the locking element 530 is pulled or pushed radially inwards by the repositioning force.

With reference to FIG. 7A, the locking element 530 is located as far as possible in the inner chamber 525, i.e. it is not completely received. The outer part 510 rotates clockwise. FIG. 7B shows the state in which, after a corresponding clockwise rotation starting from the state in FIG. 7A, an edge of the outer chamber 515 pushes the locking element into the inner chamber 525, causing the locking element 530 to be clamped between inner chamber 525 and outer chamber 515. This is equivalent to activating the rotation locking.

In the state shown in FIG. 7A, the locking element 530 is in a locking area where it is possible for the rotation locking to be activated or for the locking element 530 to become clamped between inner chamber 525 and outer chamber 515. The actual activation of the rotation locking is effected by rotating the outer part 510 at a sufficiently low rotation speed that the locking element 530 is brought into the locking position as shown in FIG. 7B.

When operating the linear actuator with such a locking arrangement 500, this rotation, which brings the locking element 530 from the locking area to the locking position, can be actively achieved by controlling the motor so that the rotation of the motor shaft causes the rotation of the outer part 510. Alternatively or additionally, the rotation of the outer part 510 can also be caused by the force acting axially on the conversion arrangement 200, for example on the spindle-nut system, if this axial force generates a retroactive rotational movement on the motor shaft and thus on the locking arrangement. Accordingly, the linear actuator can be designed to be self-locking, so to speak, if the self-locking is low or non-existent.

In this case it can be beneficial if the locking element 530 is brought into the position in the locking area shown in FIG. 7A by active control of the motor. For example, it can be ensured in this way that a reaction on the motor shaft by the axial force does not lead to an accelerated rotational movement which causes rotation above the minimum speed. A short slipping of the linear actuator is thus accepted if necessary, whereby this short slipping corresponds to a maximum of a single rotation of the outer part 510.

In principle, however, it is also possible to provide several inner chambers 525 so that the maximum rotation until the locking element 530 reaches a locking position is reduced accordingly, for example halved in the case of two inner chambers and so on.

For example, the outer part 510 and the inner part 520 of locking arrangement 500 are cylindrical in shape. As the inner chamber 525 can never completely receive the locking element 530 in the implementation forms shown so far, it is not absolutely necessary for the inner chamber 525 to have a floor or a ceiling that delimit the inner chamber in the axial direction. For example, the inner chamber 525 can therefore run in the axial direction as a continuous recess over the outer surface.

Figure 8A:
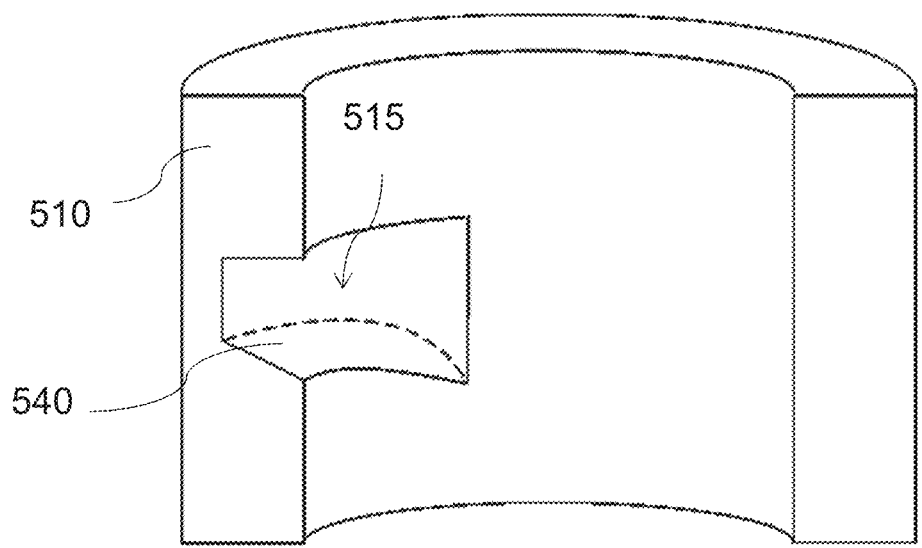
FIGS. 8A and 8B show details of implementation examples of an outer part with an outer chamber.
Figure 8B:
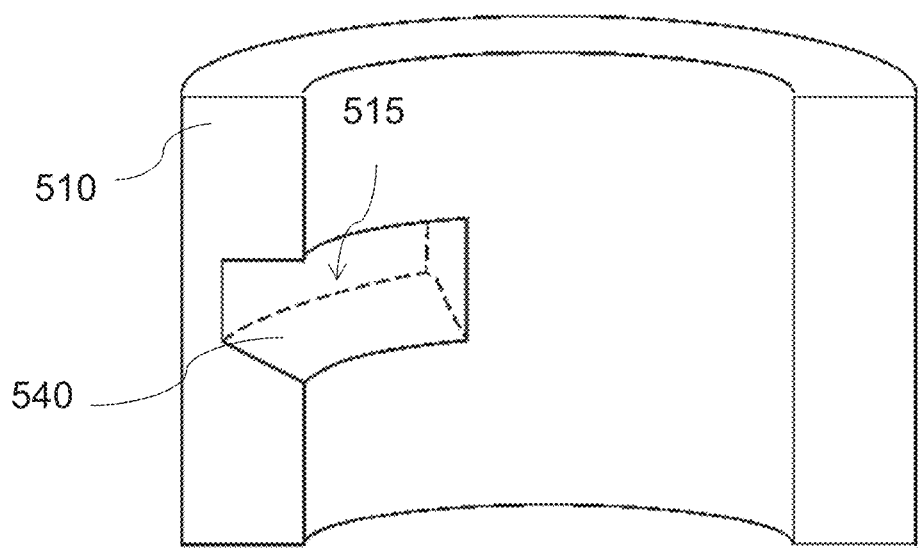

However, the receiving chamber, in the examples described so far the outer chamber 515, can completely receive the locking element 530, so that a limitation in the axial direction is also beneficial. FIGS. 8A and 8B show examples of sectional views of corresponding outer parts 510 with outer chambers 515. In these illustrations, it can be seen that the outer chamber 515 not only has a radial boundary, but also a boundary 540 on at least one side in the axial direction, which prevents the locking element 530 from falling out of the chamber or the locking arrangement 500. In particular, FIGS. 8A and 8B show that the boundary 540 is inclined radially inwards, i.e. towards the inner chamber. This means that the locking element always experiences a gravitational force, especially when the axis of rotation of the barrier arrangement 500 is essentially vertical to the earth's surface, which acts as the repositioning force and pulls the locking element 530 towards the inner chamber. This supports the mechanism that the locking element 530 is brought into the locking area or finally into the locking position when the inner chamber 525 and the outer chamber 515 are aligned with each other appropriately.

Figure 9A:
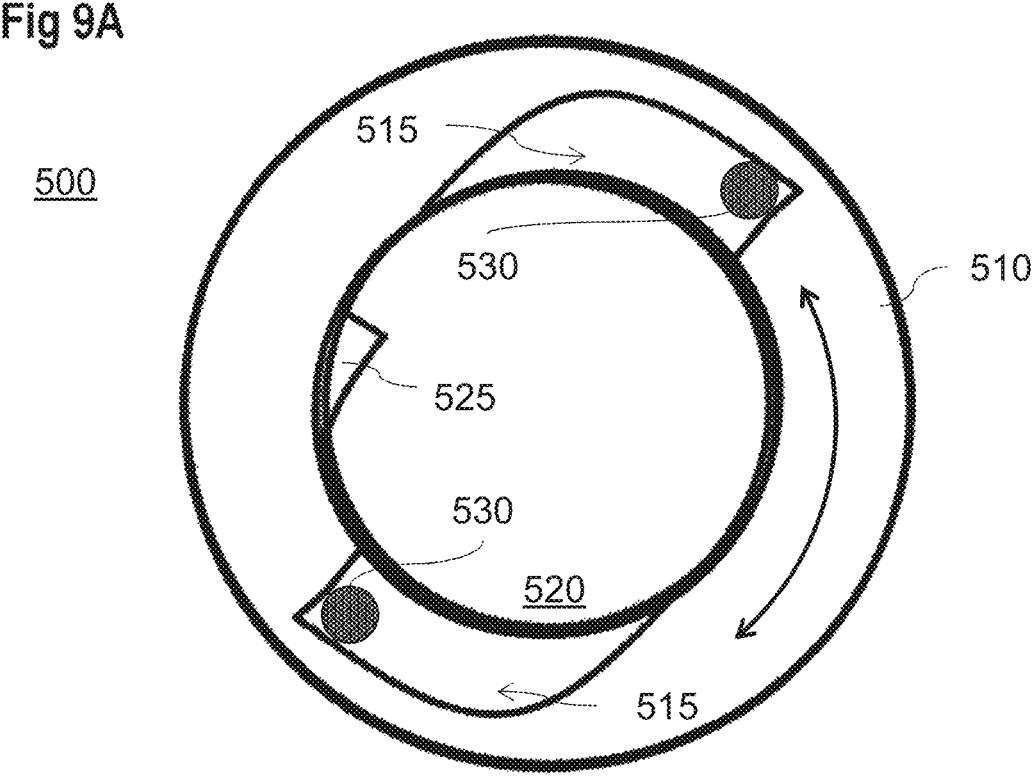
FIGS. 9A and 9B show further implementation examples of a locking arrangement for unidirectional locking.
Figure 9B:
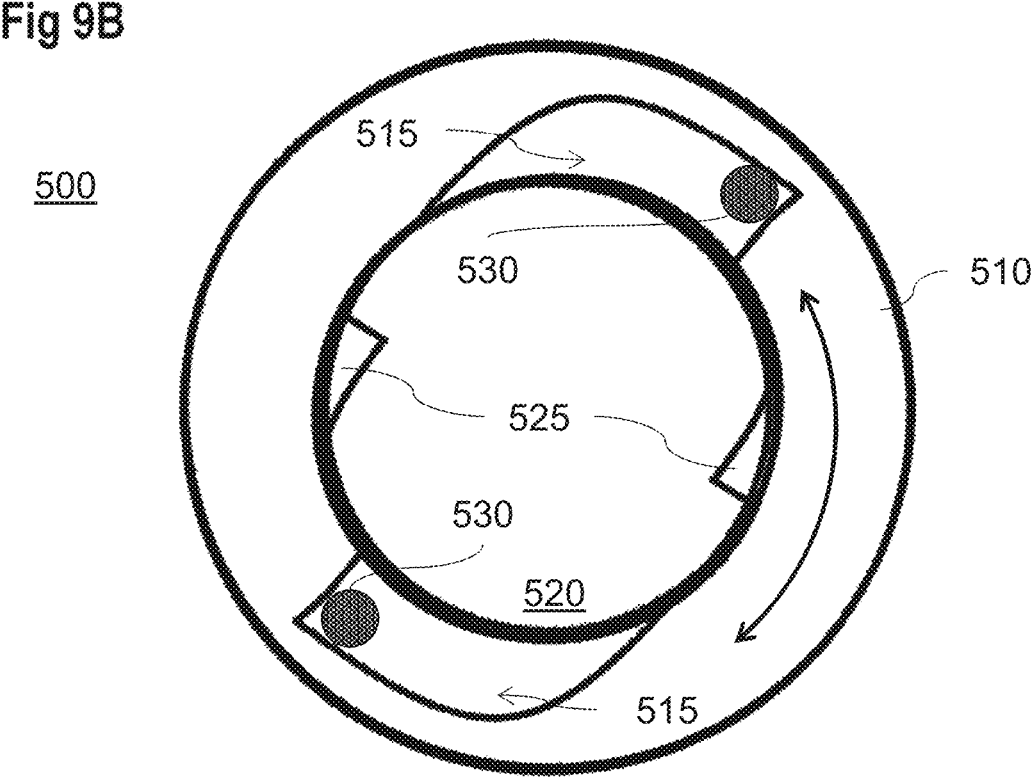

FIG. 9A and FIG. 9B show further implementations of a locking arrangement 500 where, in contrast to the implementations described above, more than one locking element, for example two locking elements 530, is used. For this purpose, the locking arrangement 500 features two outer chambers 515 as receiving chambers in the outer part as well, i.e. a separate receiving chamber for each of the locking elements 530. A number of non-receiving inner chambers 525 is at least one, whereby the design of FIG. 9A provides exactly one inner chamber 525 and the design of FIG. 9B provides exactly two inner chambers 525. The chambers are preferably evenly distributed around the circumference of the circle, i.e. in these examples they are displaced by 180° relative to each other. However, a different distribution is generally possible.

In the implementation of FIG. 9A, exactly one of the locking elements 530 can be brought into a locked state at any time, as there is only one inner chamber 525. In the version of FIG. 9B both locking elements 530 can lock simultaneously. Implementations with a larger number of receiving chambers and/or locking elements are derived by the skilled person from the previous description.

Figure 10A:
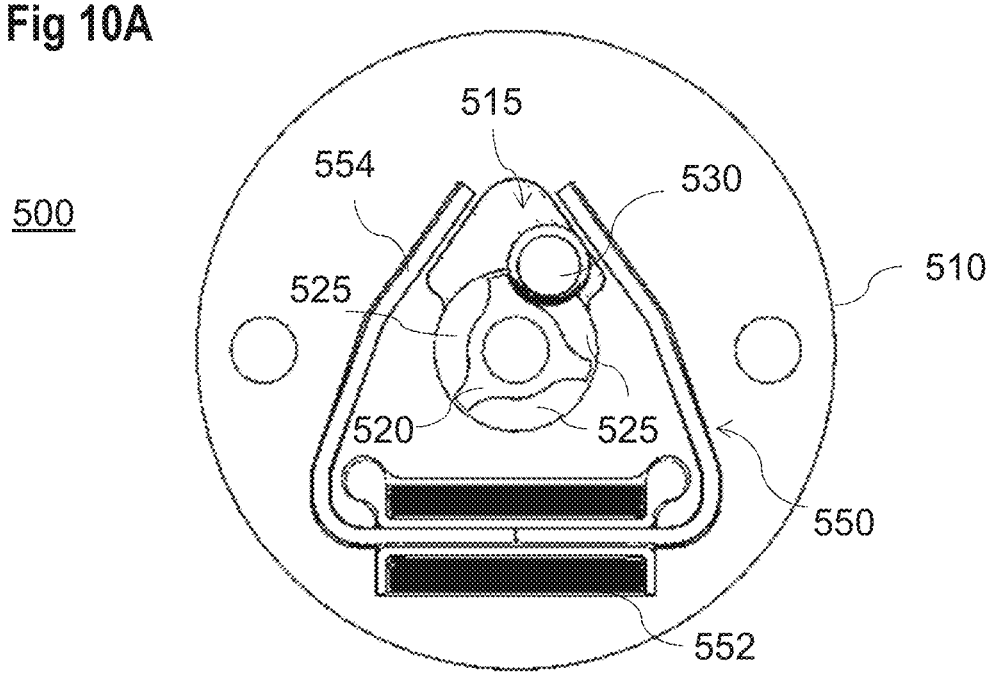
FIGS. 10A and 10B show implementation examples of a locking arrangement with an electromagnet.
Figure 10B:
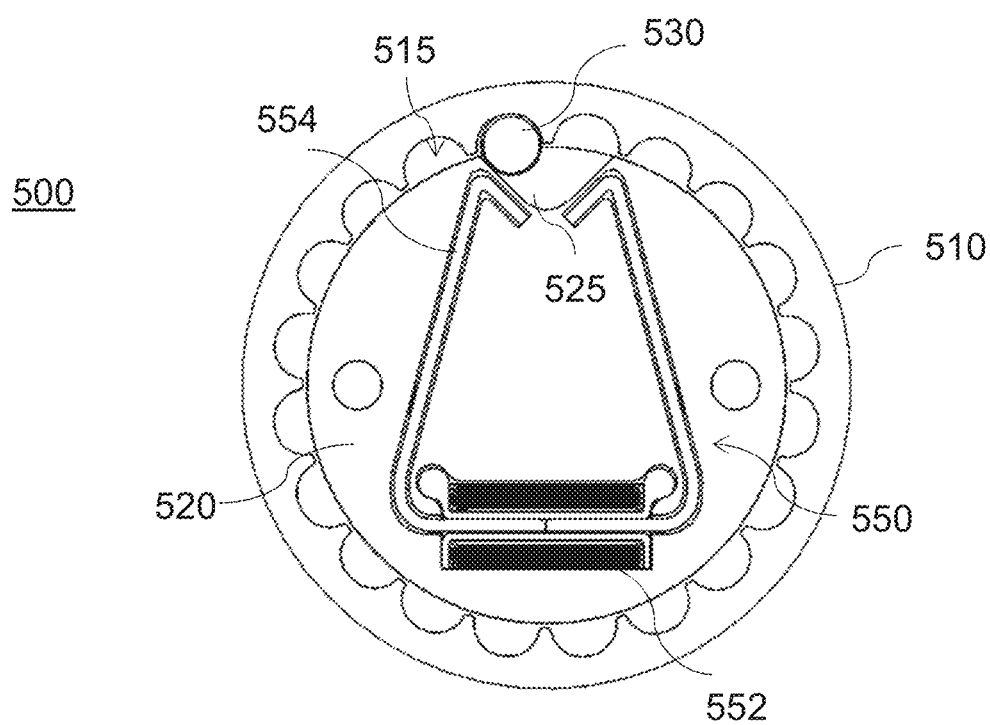

In the implementation examples described above, the deflection force is generated as a centrifugal force which must overcome the repositioning force in order to keep the locking deactivated and to allow continuous rotation of the motor shaft. With reference to FIG. 10A and FIG. 10B, the deflection force can also be generated by an electromagnet. For this purpose, the locking arrangement 500 comprises one electromagnet 550 each, which comprises a coil 552 and a metal bracket 554 as the core of the coil 552, which generates a corresponding magnetic field acting on the locking element 530 in the area of the receiving chamber. For this purpose, for example, the ends of the metal bracket 554 are arranged in the region of the receiving chamber. The locking element 530 is magnetoactive in these designs, i.e. magnetic forces act on the locking element 530 under the influence of a magnetic field. For example, the locking element is ferrous.

The implementations of FIG. 10A and FIG. 10B differ essentially in that the locking arrangement 500 in FIG. 10A has a fixed outer part 510 and a rotating inner part 520, whereas in FIG. 10B the inner part 520 is fixed and the outer part 510 rotates. The electromagnet 550 is located in each case in the fixed part, i.e. in the outer part 510 for FIG. 10A and in the inner part 520 for FIG. 10B.

With reference to FIG. 10A, the outer part 510 comprises an outer chamber 515 as a receiving chamber that can completely receive the locking element 530. The coil 552 and in particular the metal bracket 554 allow an attracting electromagnetic force to be generated in the receiving chamber 515 so that the locking element 530 can be held in the receiving chamber. Thus the electromagnetic force corresponds to the deflection force, which counteracts the repositioning force that pulls the locking element inwards. In other words, instead of the centrifugal force of the previous example implementations, the magnetic or electromagnetic force is used to enable continuous rotation of the motor shaft.

This also applies to the implementation example in FIG. 10B, where the receiving chamber is formed by the inner chamber 525. Again, when the electromagnet is activated, the locking element 530 is pulled into the receiving chamber by the metal bracket 554.

In the implementation of FIG. 10A, the inner part 520 has three inner chambers 525, which cannot completely receive the locking element 530 and can therefore each contribute to locking. The arrangement is bidirectional locking.

Similarly, the implementation of the locking arrangement 500 in FIG. 10B has only one receiving chamber 525 but a large number of external outer chambers 515. In this case too, the locking arrangement 500 is designed for a bidirectional rotation locking.

The release of the clamping of the locking element 530 as well as the radial movement into the receiving chamber is carried out in the same way as for the centrifugal force-based designs. To enable rotation of the motor shaft when the rotation locking device is deactivated, instead of centrifugal force, the electromagnetic force is generated by activating the electromagnet so that the locking element 530 is permanently held in the receiving chamber and the locking element 530 cannot move into the locking position.

Figure 11A:
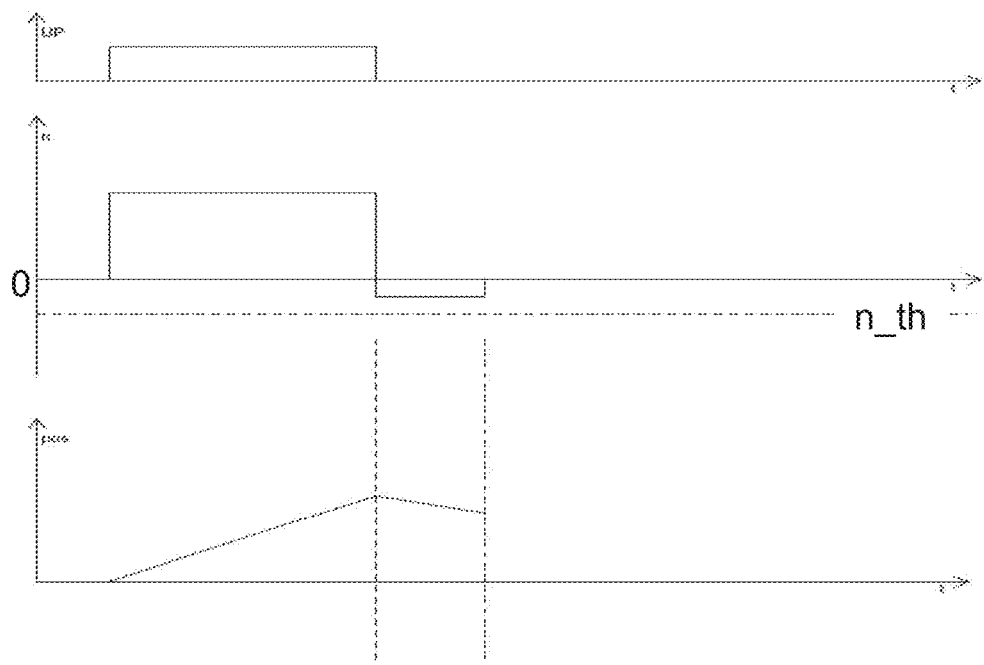
FIGS. 11A and 11B show example time signal diagrams during operation of a linear actuator.
Figure 11B:
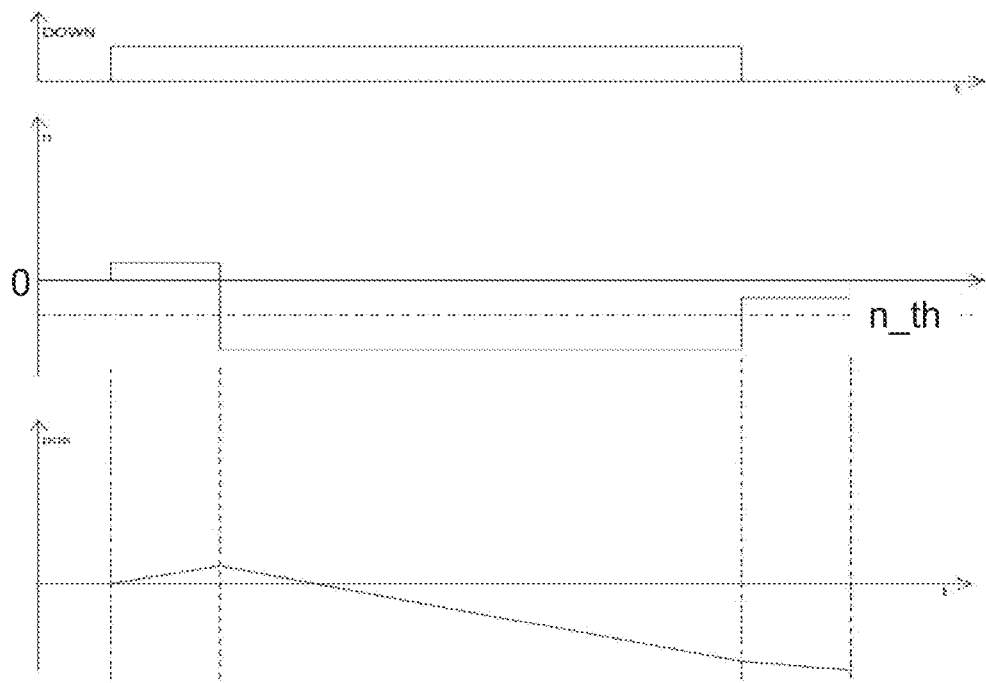

FIGS. 11A and 11B show signal-time diagrams when operating a linear actuator with one of the previously described locking arrangements 500. In these examples, the locking arrangement used is configured for a unidirectional rotation lock. In particular, the locking arrangement 500 is adapted in such a way that a movement of the linear actuator referred to as an upward direction is permanently possible, while the rotation lock can be activated in an opposite downward direction of the linear actuator.

With reference to FIG. 11A, the top diagram corresponds to a movement command in an upward direction, such as for a height-adjustable table or bed. The middle diagram corresponds to the RPM control derived from the motor control, and the lower diagram corresponds to the corresponding linear height position of the linear actuator. In the case of speed control, it can be seen that as long as the movement command in the upward direction is present, the rotation of the motor is controlled according to an upward motion of the linear actuator. Possible acceleration and braking ramps are not shown for reasons of overview.

As soon as the upward movement command ends, the locking arrangement is locked by the rotation of the motor shaft bringing the locking element into the locking area or directly into the locking position. As described above, a speed below a threshold value n_th is selected, especially in terms of absolute value. The height position changes slightly accordingly. A further movement in downward direction is not immediately possible due to the activated rotation locking.

In FIG. 11B a downward movement command is shown in the upper diagram. At the start of the movement command, locking arrangement 500 is first unlocked. To do this, the motor control unit first controls the motor in such a way that the motor shaft causes a linear upward movement, represented by a low intensity rotation movement in positive direction. This releases the locking element 530 from the clamping and brings it into the receiving chamber. This upward movement can also be referred to as run-up. At the end of the run-up, the locking element 530 is located in the receiving chamber. Then the actual downward movement in the direction of rotation in which the rotation locking can act begins. The locking element is located at a certain run-up distance in front of the receiving chamber before the start of the movement. The locking element is accelerated over the run-up distance to a speed that is greater than the threshold value n_th, so that the resulting centrifugal force overcomes the repositioning force. The locking element is held in the receiving chamber and does not fall or move towards the inner chamber. The locking effect is respectively remains deactivated.

After the end of the movement command, the locking arrangement is locked. Locking is similar to locking during upward travel as described in FIG. 11A.

In the diagrams in FIGS. 11A and 11B the locking is immediately followed by the end of the movement command. Alternatively, the motor control may wait, preferably for a short period of time, before the actual locking is triggered. This can, for example, reduce the mechanical load on the linear actuator due to the change of direction, which can also have a positive effect on the user experience of a user of adjustable furniture.

The diagrams in FIGS. 11A and 11B refer primarily to implementations of the locking arrangement in which the deflection force is generated as centrifugal force. With reference to the versions with electromagnets in FIGS. 10A and 10B, however, the skilled person can see that even with such designs it is necessary to unlock the locking arrangement by a controlled counter-movement of the motor shaft. In particular, the motor control unit controls the motor so that the clamping of the locking element 530 between the inner chamber 525 and the outer chamber 515 is released. The rotation is preferably performed to such an extent that the locking element can be pulled into the receiving chamber by activating the electromagnet. Logically, there are then no limits to the rotational speed in the unlocked state.

For locking, the locking arrangement is again aligned in such a way that the locking element is located in the locking area and is brought into the locking position by active motor movement and/or passive force application.

The following FIGS. 12 to 15 show different variants of how a motor arrangement 100 and a locking arrangement 500 are coupled together within a linear actuator to enable selective rotation locking. In particular, the elements of the locking arrangement 500 are only shown schematically, whereby reference is made to the previous explanations with regard to concrete implementation forms. The motor arrangement 100 comprises, for example, a motor 120 and an optional gearbox 130, which is designed in particular as a speed reduction gearbox. A motor shaft 110 is not visible in all design forms. In each of the implementations shown, the outer part 510 forms a rotor of the locking arrangement 500 and the inner part 520 forms a stator of the locking arrangement 500. This allocation is particularly given in such locking arrangements in which the deflection force is generated as centrifugal force. In the variants with electromagnets, the inner part 520 can also be designed as a rotor and the outer part 510 as a stator of the locking arrangement 500.

FIG. 12 shows an example of a linear actuator in which the locking arrangement 500 is coupled to the motor shaft 110 via a rotationally fixed connection between the rotor of the locking arrangement and a spindle 210 of the conversion arrangement, with the stator of the locking arrangement 500 being attached to a housing of the motor arrangement 100. In the version shown, this corresponds to the housing of the gearbox 130, with the stator of the locking arrangement 500 being attached to the housing of motor arrangement 120 if the latter is omitted. Other elements of the conversion arrangement apart from the spindle 210 are not shown for reasons of overview.

The housing of motor arrangement 100 and, if applicable, of the gearbox 130 are, for example, of cylindrical design. Locking arrangement 500 can in principle also be integrated into such a housing.

In the variant shown in FIG. 13, the locking arrangement 500 is coupled to the motor shaft 110 by a rotationally fixed connection of the rotor of locking arrangement 500 to the motor shaft 110, with the stator of locking arrangement 500 being attached to a housing of motor arrangement 100, here the motor 120. For reasons of overview, other elements of the conversion arrangement 200 in addition to spindle 210 are not shown in FIG. 13 either.

The motor housing can be cylindrical, for example. Typically, the motor housing is closed on one side and only allows the motor shaft 110 to be passed through and supported. An end cap can be provided on the opposite side. This closes the housing after the stator, rotor and other motor components have been inserted into the motor housing during production. Locking arrangement 500 can be installed inside the motor housing, particularly near one or both ends. Alternatively, the locking arrangement 500 can be an integral part of the end cap.

In both configurations of FIGS. 12 and 13, it is easy for the skilled person to see that with the locking arrangement 500, the outer rotor can easily be replaced by an inner rotor, and at the same time the inner stator becomes an outer stator.

Figure 14:
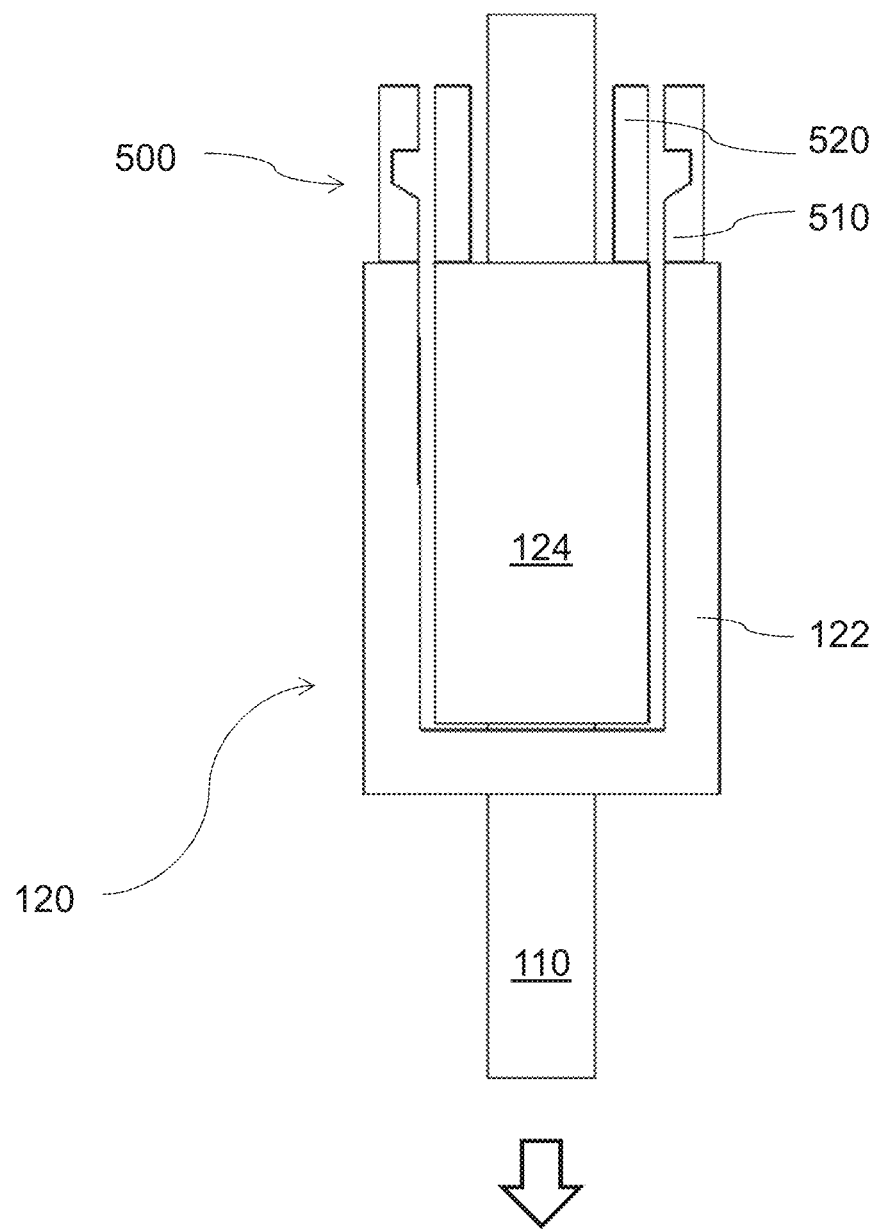

In the configuration of FIG. 14 the motor 120 has an outer rotor 122 and an inner stator 124. The coupling of the locking arrangement 500 to the motor shaft 110 is achieved by a rotationally fixed connection of the rotor of the locking arrangement to the outer rotor 122. The inner part 520 as stator of the locking arrangement 500 is fixed to the inner stator 124 of the motor 120. Further elements of the linear actuator are again not shown for reasons of overview. Similar to the configuration in FIG. 13, the locking arrangement 500 can also be an integral part of an end cap or at least be covered by such an end cap.

FIG. 15 shows a configuration in which the locking arrangement 500 is mounted on a part of the conversion arrangement 200 facing away from the motor. In this case, for example, a non-rotating hollow tube with an external thread is attached to the motor arrangement 100 or to the gearbox 130. The nut of a second hollow tube 230 engages in this external thread 220, resulting in the connection 225 between the nut and the first hollow tube 220. A rotation of the second hollow tube 230 produces a linear movement of the second hollow tube 230 along the first non-rotating hollow tube 220 through the nut and the external thread of the first hollow tube 220. The transmission of the motor rotation to the second hollow tube 230 takes place via a rotationally rigid, sliding connection between a T-shaped rod 240 and the second hollow tube 230. This connection 250 is formed, for example, by a spline inside the second hollow tube 230 and the T-shaped extended rod 240 engaging in this spline. When this rod 240 rotates, the second hollow tube 230 also rotates, which results in a linear displacement of the second hollow tube 230 along the axis of rotation of the rod 240.

In such an exemplary implementation of the conversion arrangement 200, for example, the outer part 510 as the rotor of the locking arrangement 500 is attached to the rotating rod 240, while the inner part 520 as the stator of the locking arrangement 500 is attached to the non-rotating first hollow tube 220.

In general terms, in such a configuration the locking arrangement 500 is formed with the motor shaft 110 by a rotationally fixed connection of the rotor of the locking arrangement to a rotating component of the conversion arrangement. The stator is attached to a non-rotating component of the conversion arrangement. Other forms of the conversion arrangement can be alternatively selected.

As can be seen from the illustrations in FIGS. 12 to 15, the locking arrangement can be located either inside the motor housing, i.e. integrated in the motor, or outside the motor housing.

A linear actuator according to one of the previously described implementations can form an actuator system together with a motor control. In addition to conventional control functions, such a motor control is, for example, adapted to activate, deactivate and keep deactivated the rotation locking according to the previously described method in order to enable a continuous motor movement. This includes in particular the control of the motor to move the locking element into the locking area and the optional active clamping of the locking element, and further the control of the motor to release the clamping.

Such a linear actuator or an actuator system with such a linear actuator can be used in a variety of different pieces of furniture. In particular, such pieces of furniture can be formed by tables or other table furniture, but also by adjustable beds, in which, for example, a foot part and/or a head part of the bed is adjustable. Another application is, for example, adjustable seating and reclining furniture, such as television armchairs or the like.

The invention claimed is:

1. A linear actuator for adjusting a piece of furniture, the linear actuator comprising
    a motor with a motor shaft;
    a conversion arrangement coupled to the motor shaft and adapted to convert a rotary motion generated by the motor shaft into an elongation of the linear actuator; and
    a locking arrangement coupled directly or indirectly to the motor shaft and adapted to selectively cause rotation locking of the motor shaft by means of a locking element; wherein
    the locking arrangement comprises an inner part with at least one inner chamber and an outer part radially surrounding the inner part and having at least one outer chamber;
    the outer part and the inner part are rotatable relative to one another in such a way that the at least one inner chamber and the at least one outer chamber can be aligned with one another;
    wherein either
    the at least one inner chamber is arranged as a receiving chamber for completely receiving the locking element and the at least one outer chamber is arranged for not completely receiving the locking element; or
    the at least one outer chamber is arranged as a receiving chamber for completely receiving the locking element and the at least one inner chamber is arranged for incompletely receiving the locking element;
    wherein
    the rotation locking is activated by clamping the locking element between the at least one inner chamber and the at least one outer chamber by means of rotation of the inner part and the outer part relative to each other;
    the rotation locking is deactivated by rotating the inner part and the outer part relative to each other in such a way that the clamping of the locking element is released, and by moving the locking element radially into the receiving chamber; and rotation of the motor shaft with the rotation locking being deactivated is enabled by generating a deflection force acting radially in the direction of the receiving chamber on the locking element, which deflection force is greater than a repositioning force acting radially in the opposite direction on the locking element.

2. The linear actuator according to claim 1, which is designed in such a way that, when deactivating the rotation locking device, the rotation of the inner part and the outer part relative to one another is effectable by a controlled rotational movement of the motor shaft.

3. The linear actuator according to claim 2, wherein, when deactivating the rotation locking, the rotation of the inner part and the outer part relative to each other amounts to less than 360°.

4. The linear actuator according to claim 1, wherein the repositioning force is formed by a spring force or a gravitational force.

5. The linear actuator according to claim 1, wherein the receiving chamber has a radially inclined boundary on at least one side in the axial direction, through which the repositioning force on the locking element is effectable by a gravitational force.

6. The linear actuator according to claim 1, which is designed such that the deflection force holds the locking element in the receiving chamber.

7. The linear actuator according to claim 1, wherein the conversion arrangement alone or in combination with the motor is not self-locking.

8. The linear actuator according to claim 1, wherein one part of a group consisting of the outer part and the inner part forms a rotor of the locking arrangement coupled to the motor shaft and another part of said group forms a stator of the locking arrangement, and wherein the locking arrangement is coupled to the motor shaft according to any one of the following:
   a rotationally fixed connection of the rotor to the motor shaft, the stator being fixed to a housing of the motor or of a gearbox;
   a rotationally fixed connection of the rotor to a spindle of the conversion arrangement, the stator being fixed to a housing of the motor or of a gearbox;
   a rotationally fixed connection of the rotor of the locking arrangement to an outer rotor of the motor, the stator of the locking arrangement being fixed to an inner stator of the motor;
   a rotationally fixed connection of the rotor to a rotating component of the conversion arrangement, the stator of the locking arrangement being attached to a non-rotating component of the conversion arrangement.

9. The linear actuator according to claim 1, wherein the locking arrangement is adapted to permanently enable rotation of the motor shaft in a first rotational direction and to selectively effect the rotation locking in a second rotational direction opposite thereto.

10. The linear actuator according to claim 1, wherein the locking element is designed as a rolling body, as a ball.

11. The linear actuator according to claim 1, wherein
the outer part is designed to rotate about the inner part;
the at least one outer chamber is formed as the receiving chamber; and the locking arrangement is arranged to generate the deflection force by a centrifugal force by means of rotation of the outer part around the inner part, wherein a rotation speed of the outer part is greater than a threshold value.

12. The linear actuator according to claim 1, wherein the locking element is magnetoactive and the locking arrangement comprises an electromagnet and is adapted to generate the deflection force by means of the electromagnet as an electromagnetic force acting on the locking element.

13. The linear actuator according to claim 12, wherein either
   the outer part is designed to rotate about the inner part and the at least one inner chamber is designed as the receiving chamber; or
   the inner part is designed to rotate inside the outer part and the at least one outer chamber is designed as the receiving chamber.

14. The linear actuator according to claim 1, further comprising a measuring device for determining a relative position of the inner part and the outer part to each other.

15. An actuator system comprising a linear actuator according to claim 1 and a motor control which is configured,
   to enable activation of the rotation locking by controlling the motor to rotate the motor shaft such that the at least one inner chamber and the at least one outer chamber are aligned with each other so that the locking element is moved out of the receiving chamber by the repositioning force; and
   to deactivate the rotation locking by controlling the motor to rotate the motor shaft.

16. The actuator system according to claim 15, wherein the rotation of the inner part and of the outer part relative to each other for clamping the locking element between the at least one inner chamber and the at least one outer chamber is effectable by controlling the motor to a rotational movement of the motor shaft and/or by applying a force to the conversion arrangement along a direction of the elongation.

17. The actuator system according to claim 15, wherein the motor control is further configured to effect, when the rotation locking is deactivated, the generation of the deflection force which enables rotation of the motor shaft.

18. The actuator system according to claim 15, wherein the motor control is mounted to the linear actuator or forms an integrated unit with the linear actuator.

19. A piece of furniture with at least one adjustable component and with a linear actuator according to claim 1 for adjusting the component.

20. A method for controlling a linear actuator according to claim 1, the method comprising:
   enabling activation of the rotation locking device by controlling the motor to a rotational movement of the motor shaft such that the at least one inner chamber and the at least one outer chamber are aligned with each other so that the locking element is moved out of the receiving chamber by the repositioning force;
   deactivating the rotation locking by controlling the motor to rotate the motor shaft; and
   effecting the generation of the deflection force when the rotation lock is deactivated for rotation of the motor shaft.

* * * * *